United States Patent
Worthington (10) Patent No.: US 11,489,287 B1
(45) Date of Patent: Nov. 1, 2022

(54) ELECTRICAL CONNECTOR ALIGNMENT SYSTEM FOR A PALLET CHANGER

(71) Applicant: Techniks, LLC, Indianapolis, IN (US)

(72) Inventor: Scott Worthington, Flat Rock, IN (US)

(73) Assignee: Techniks, LLC, Indianapolis, IN (US)

( * ) Notice: Subject to any disclaimer, the term of this patent is extended or adjusted under 35 U.S.C. 154(b) by 0 days.

(21) Appl. No.: 17/828,661

(22) Filed: May 31, 2022

(51) Int. Cl.
*H01R 13/62* (2006.01)
*H01R 13/631* (2006.01)
*B25B 11/00* (2006.01)
*H01F 7/02* (2006.01)
*H01R 13/52* (2006.01)

(52) U.S. Cl.
CPC .......... *H01R 13/631* (2013.01); *B25B 11/002* (2013.01); *H01F 7/0252* (2013.01); *H01R 13/5227* (2013.01)

(58) Field of Classification Search
CPC .......................... H01R 13/631; H01F 7/0252
See application file for complete search history.

(56) References Cited

U.S. PATENT DOCUMENTS

| | | | | |
|---|---|---|---|---|
| 3,603,860 A | * | 9/1971 | Johnson | H02J 7/0045 320/109 |
| 4,959,020 A | * | 9/1990 | Di Rosa | H01R 13/631 439/138 |
| 4,978,313 A | * | 12/1990 | Kameyama | H01R 13/74 439/248 |
| 4,996,628 A | * | 2/1991 | Harvey | H05K 7/1454 361/809 |
| 5,161,662 A | * | 11/1992 | Kuse | B23Q 1/0009 29/33 P |
| 5,199,892 A | * | 4/1993 | Campbell | H01R 13/631 439/246 |
| 5,213,192 A | * | 5/1993 | Kuse | B23Q 1/0009 483/68 |
| 5,504,991 A | * | 4/1996 | Parmley, Sr. | B60L 53/30 320/109 |
| 5,547,304 A | * | 8/1996 | Cascio | F16L 39/00 403/80 |
| 6,592,387 B2 | * | 7/2003 | Komenda | H01R 13/6315 439/247 |
| 6,595,387 B1 | * | 7/2003 | Zimmermann | B65D 83/0817 206/812 |
| 6,979,229 B1 | * | 12/2005 | Liao | H01R 13/62 439/822 |
| 7,294,010 B1 | * | 11/2007 | Shaikh | H01R 13/629 439/247 |
| 7,402,062 B2 | * | 7/2008 | Perry | H01R 11/287 439/248 |
| 7,661,961 B2 | * | 2/2010 | Brinkhous | B62K 5/025 439/35 |
| 9,337,577 B1 | * | 5/2016 | Hitchcock | H01R 13/6315 |
| 2011/0081799 A1 | * | 4/2011 | Tang | H01R 13/631 439/374 |

* cited by examiner

*Primary Examiner* — Neil Abrams
(74) *Attorney, Agent, or Firm* — Shuttleworth & Ingersoll, PLC; Jason R. Sytsma (57) ABSTRACT

A dampening system combined between a mounting bracket and a block oriented along an x-axis. An electrical connector of a pair of electrical connectors combined to the block for relative movement about a y-axis and a z-axis to combine with the other electrical connector on the magnetic chuck of a pallet changing system.

17 Claims, 8 Drawing Sheets

FIG.5

ELECTRICAL CONNECTOR ALIGNMENT SYSTEM FOR A PALLET CHANGER

TECHNICAL FIELD

This disclosure relates to a pallet changer for performing pallet loading and unloading operations between a table of a machine tool and a pallet support, and, more specifically, this disclosure relates to an alignment system for the electrical connectors that magnetize and demagnetize an electropermanent magnetic chuck.

BACKGROUND INFORMATION

In modern industry, the high cost of complex machine tools and the expense of labor require that the machine tools and the labor force be utilized as efficiently as possible. One known way to provide this efficiency is to secure workpieces to movable pallets, and to then transfer the pallet and workpiece combination to and from a work-performing station at the machine tool. By quickly and accurately locating the pallet with respect to the machine tool work-performing station, the workpiece is correspondingly located. The machine tool can then quickly and accurately perform its cycle of operations on the workpiece. Meanwhile, another pallet and workpiece can be set up and readied for movement to the machine tool work-performing station. In this way, the machine tool can perform machining operations during most of its operating time, Machine operations are not interrupted or delayed by workpiece set-up and transfer tasks being performed directly at the machine tool workstation.

Magnetic chucks for pallet changers have been developed to increase the speed and efficiency in which workpieces can be setup and machined. Compared to traditional fixturing methods where a fixture holds the workpiece in place during machining, a magnetic chuck holds the workpiece in place and frees up all five sides of the workpiece for machining in a single operation. Magnetic chucks are made with electropermanent magnets (EPM). A permanent magnetic field can be switched on or off by a pulse of electric current in a wire winding around part of the magnet. This allows the chuck to be magnetized and demagnetized at will for selectively securing the workpiece to the pallet for machining.

To implement some aspects of this concept, a number of pallet and workpiece handling systems have been previously offered. In general, however, the design of these systems does not permit workpiece pallets to be expeditiously transferred between the pallet stand and the work-performing station. One particular point of failure regards the electrical connector between the pallet stand and the magnetic chuck. These must be connected manually, because when the two connectors are not precisely aligned, one or both connectors are easily damaged, which shuts down the operation of the pallet stand.

Accordingly, there is a need for an electrical connector alignment system for a pallet changer for automatic connection of the electrical connectors.

SUMMARY

In accordance with one aspect of the present invention, an alignment system for a pair of electrical connectors on a pallet changing system is disclosed. The pallet changing system comprises a support station for supporting a pallet and a magnetic chuck that moves to and from a machining center on top of the pallet. The alignment system comprises of a mounting bracket combined to the support station, a block, a dampening system combined between the mounting bracket and the block oriented along an x-axis, and an electrical connector of the pair of electrical connectors combined to the block for relative movement about a y-axis and a z-axis. A z-alignment block and a y-alignment block can be provided with one of the z-alignment block and the y-alignment block being combined to the block for movement with respect to the block.

In an embodiment, the z-alignment block is combined to the block and the y-alignment block is combined to the z-alignment block. A guide can be combined to y-alignment block to guide the one electrical connector of the pair of electrical connectors to the other electrical connector electrically connected to the magnetic chuck. The guide can comprise a pair of wheel bars extending about an x-axis outward from the electrical connector. The pair of wheel bars can each further comprise a y-axis roller and a z-axis roller oriented in the opposite direction of each other surrounding a space in which to receive the other electrical connector that is electrically connected to the magnetic chuck.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
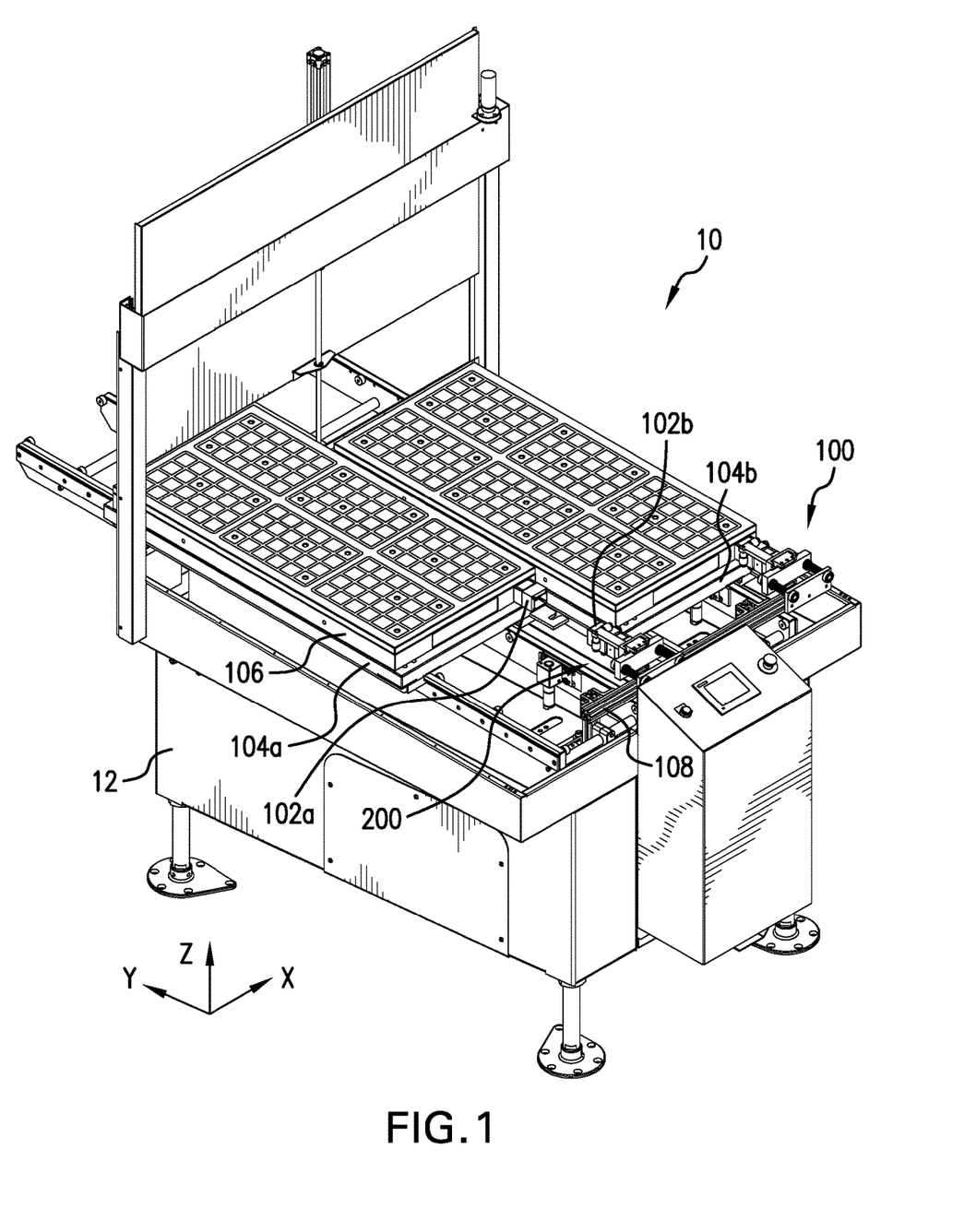
FIG. 1 is a front, left-side perspective view of a pallet changer according to this disclosure.

FIG. 1 shows a pallet changing system 10 with an alignment system 100 for a pair of electrical connectors 102 according to this disclosure. Pallet changing system 10 allows for pre-mounting of workpieces on pallets 104 that can be moved in and out of a machining center with automatic connection of electrical connectors 102. This way, while one of pallets 104 is in the machining center, the other pallets 104 can be mounted with the workpieces. In this way, the machine center can perform machining operations during most of its operating time. Machine operations are not interrupted or delayed by workpiece set-up and transfer tasks being performed directly at the machine tool workstation.

Pallet changing system 10 comprises a support station 12 for supporting two or more pallets 104 for relative movement to and from a machine center. As illustrated, pallet 104a is being maneuvered toward the machine center while pallet 104b is in a stationary position for setting up the work pieces. Each of pallets 104 has positioned thereon a magnetic chuck 106 comprising an electropermanent magnet (EPM), which can have a permanent magnetic field that can be switched on or off by a pulse of electric current in a wire winding around part of the magnet. This allows magnetic chuck 106 to be magnetized and demagnetized at will for selectively securing the workpiece to the pallets 104 for machining.

Figure 2:
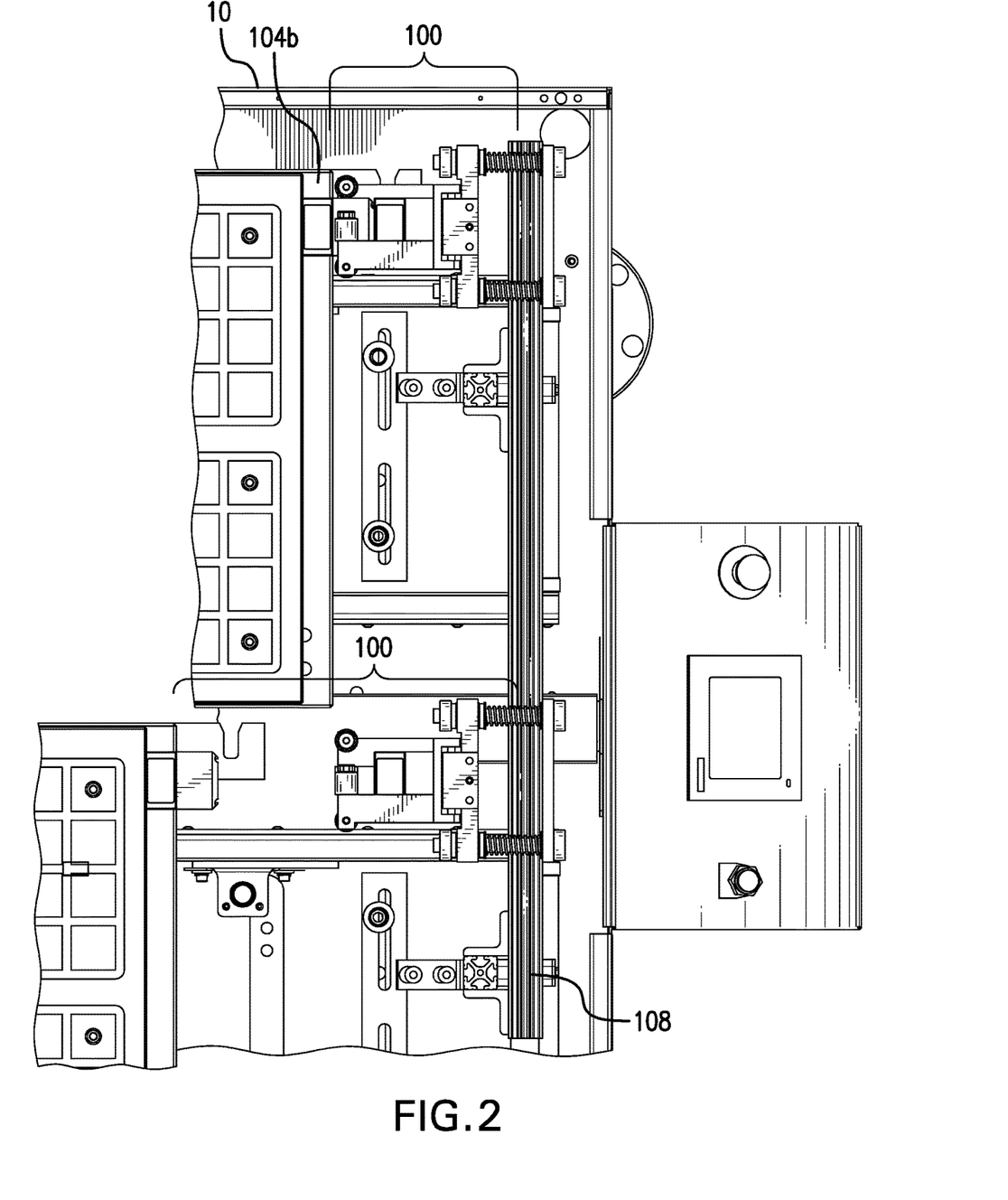
FIG. 2 is a top view of the alignment system of the pallet changer of FIG. 1.

Turning to FIG. 2, shown is a top view of alignment system 100 on pallet changing system 10. As illustrated, is an alignment system 100 for the magnetic chuck 106 for each pallet 104. Alignment system 100 for pallet 104a is shown separated to represent the position of pallet 104a in the machining center while alignment system 100 for pallet 104b is attached to magnetic chuck 106. Each alignment system 100 is mounted to a track 108 that spans the width of support station 12. This allows for the alignment of pair of electrical connectors 102 of alignment system 100. But, this alignment can shift over time either because alignment system 100 moves on track 108 or because pallets 104 shift with respect to alignment system. In order to selectively turn on and off the EPM of magnetic chuck 106, an electrical connection between the power supply on support station 12 of pallet changing system 10 must be connected to magnetic chuck 106 by way of pair of electrical connectors 102. With pair of electrical connectors 102 comprising of a plug 102a and socket 102b, accurate and consistent alignment of plug 102a and socket 102b must be ensured to prevent damage. To ensure this, alignment system 100 is configured for multi-dimensional relative movement to ensure alignment.

Figure 5:
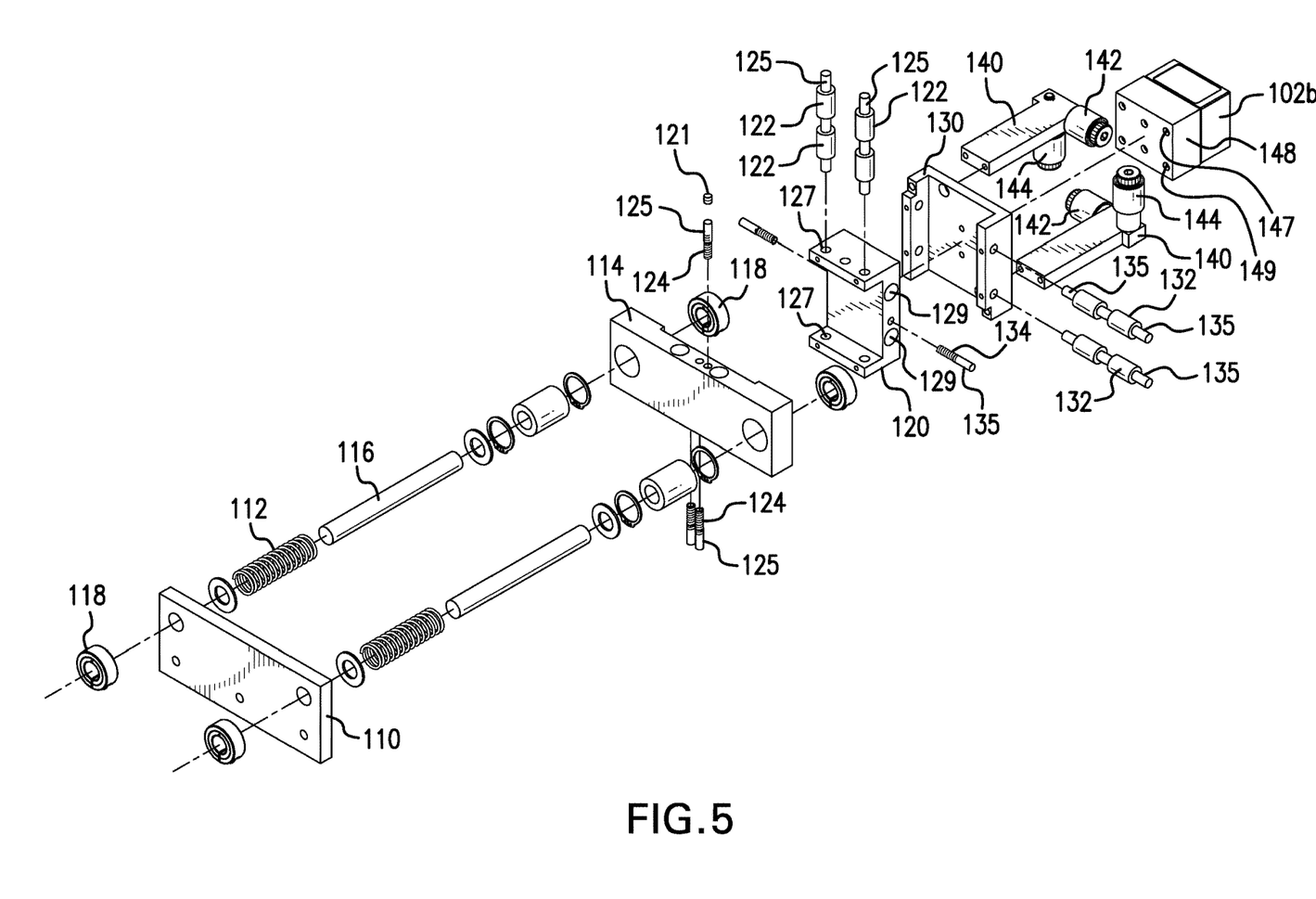
FIG. 5 is an exploded view of the alignment system of FIG. 1.

Turning to FIG. 5, an exploded view of alignment system 100 is shown. Alignment system 100 comprises of a mounting bracket 110 for mounting alignment system 100 on track 108. At least one spring 112 is positioned between mounting bracket 110 and a block 114 oriented along the X-axis to protect alignment system 100 in the event that pallet 104 moves backward to fast or beyond the home position. Spring 112 is mounted on a guide shaft 116 which is coupled to each of mounting bracket 110 and block 114 by collars 118 to allow block 114 to compress toward mounting bracket 110 in the event of a crash. Those skilled in the art will recognize that spring 112 includes any type of spring, including mechanical springs, gas springs or cylinders, and the like.

Alignment system 100 comprises of a z-alignment block 120 that is coupled to block 114 for movement up and down about the z-axis about a linear bearing 122 on a shaft 125. Three springs 124 are positioned on corresponding rods 126 to couple z-alignment block 120 to block 114. A set screw 121 can be positioned in the hole in the top of block 114 above spring 124 to limit the path of travel in order to counteract the weight of the outward elements of alignment system 100 so that the other two springs 124 can keep z-alignment block 120 centered with respect to block 114 and a longitudinal axis extending through alignment system 100.

An y-alignment block 130 is provided and slidingly coupled to z-alignment block 120 in a similar manner. Y-alignment block 130 that is coupled to z-alignment block 120 for movement left and right about the Y-axis about a linear bearing 132 on a shaft 135. Two springs 134 are positioned on corresponding rods 136 to couple y-alignment block 130 to z-alignment block 120. This keeps y-alignment block 130 centered with respect to z-alignment block 120 and a longitudinal axis extending through alignment system 100.

Mounted to y-alignment block 130 is socket 102b of pair of electrical connectors 102. This avows socket 102b to move up and down about the z-axis and left and right about the Y-axis. To help guide socket 102b into plug 102a on magnetic chuck 106, two wheel bars 140 are provided. Each of wheel bars 140 are mounted to y-alignment block 130 and configured to extend outward along the y-axis towards plug 102a on magnetic chuck 106, Each of wheel bars 140 has attached thereto an Y-axis rover 142 and a z-axis rover 144 oriented in opposite directions and toward plug 102a on magnetic chuck 106. Each of y-axis roller 142 and z-axis roller can comprise neoprene or other suitably soft material that is mounted on a corresponding shaft and bearing so that it easily rotates as plug 102a on magnetic chuck moves towards socket 102b.

Figure 3:
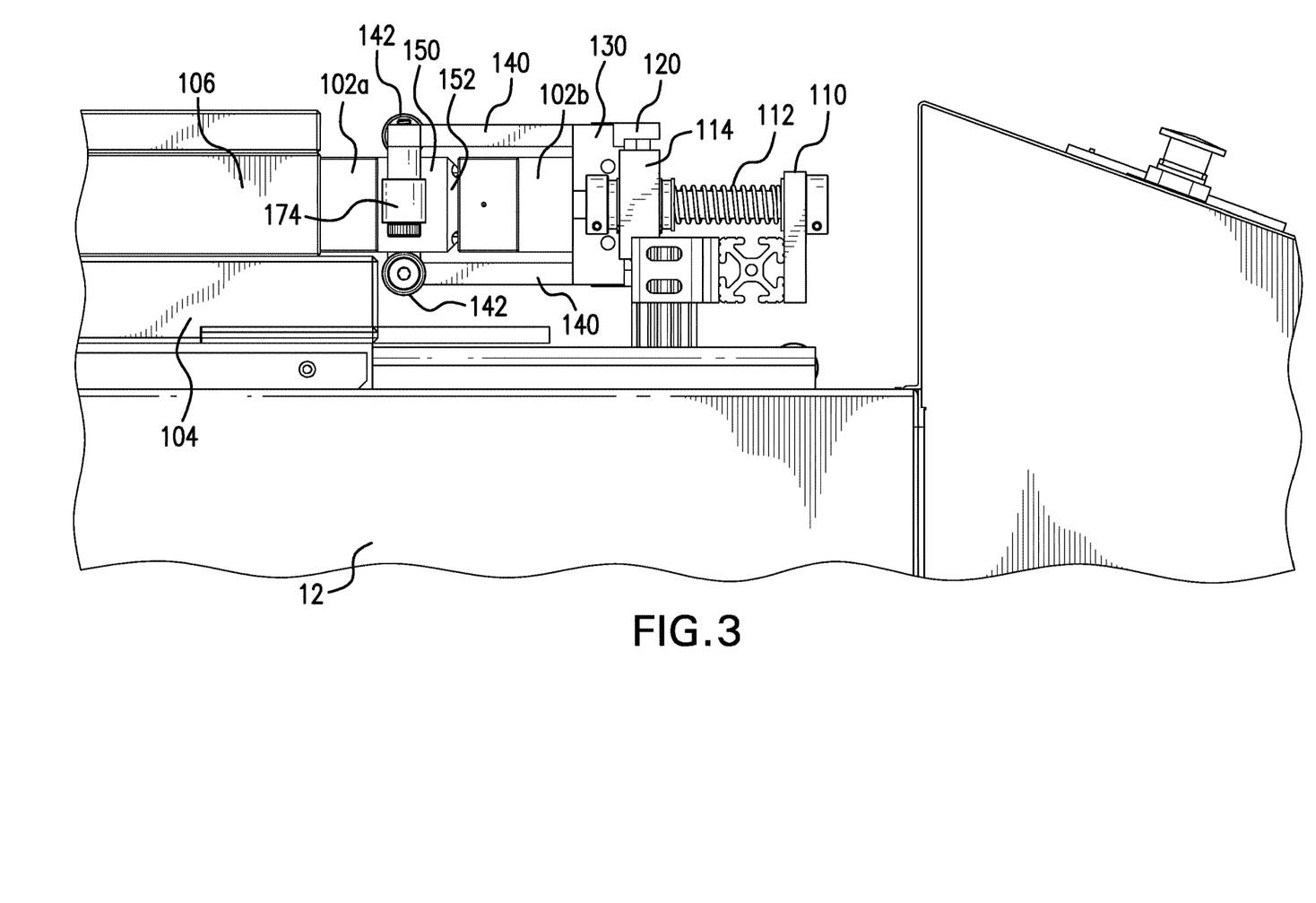
FIG. 3 is a side view of the alignment system of FIG. 2.

Referring back to FIGS. 3 through 4, to assist guiding socket 102b on alignment system 100 to plug 102a on magnetic chuck 106 a guide block 150 can be provided on plug 102a, Guide block 150 can be positioned on plug 102a and configured with a chamfered surface 152 around its perimeter to help guide socket 102b toward plug 102a.

Referring back to FIG. 5, electrical wiring from support station 12 to socket 102b of pair of electrical connectors 102 can be maneuvered around connection system through a through hole 149 in the back of a connection block 138 that attaches socket 102b to the front side of y-alignment block 130. A drain hole 147 can also be added to the back of connection block 138 to drain any coolant that seeps into socket 102b.

Figure 4A:
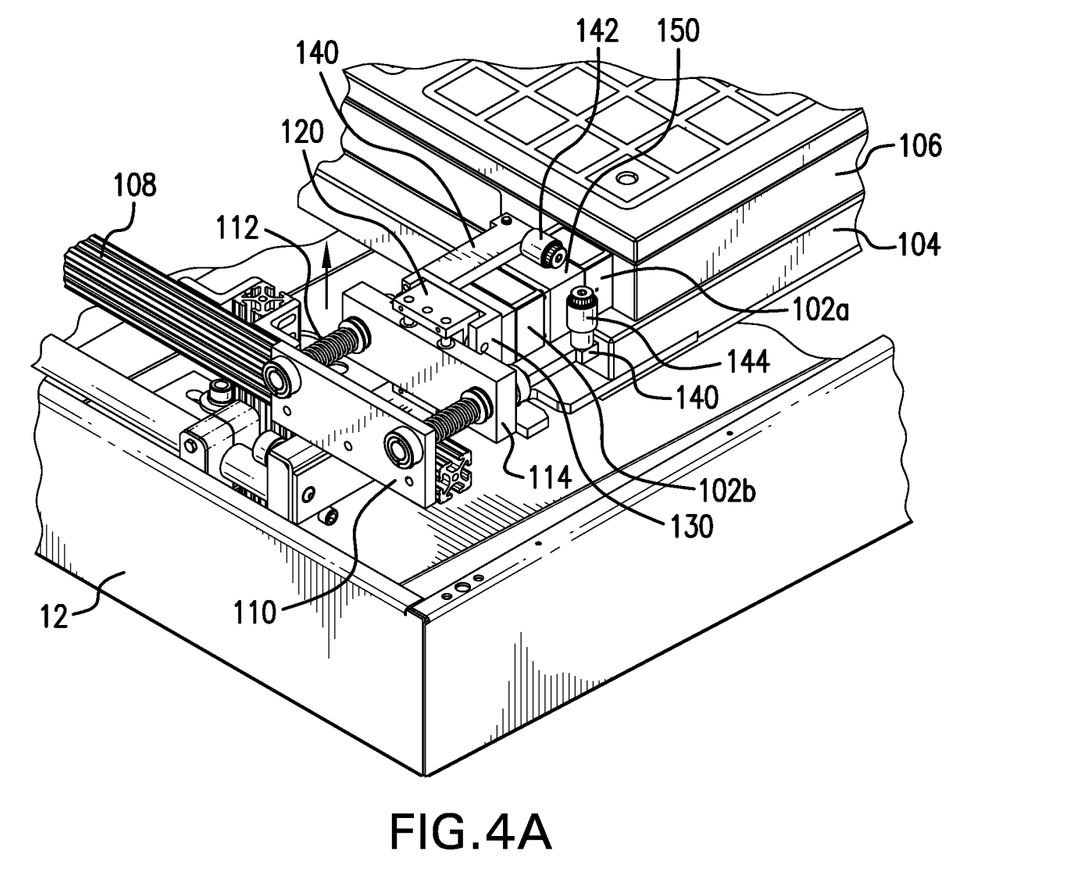
FIG. 4A is a close-up, right-side, perspective view of the alignment system of FIG. 2 with the alignment system shifted upward.
Figure 4B:
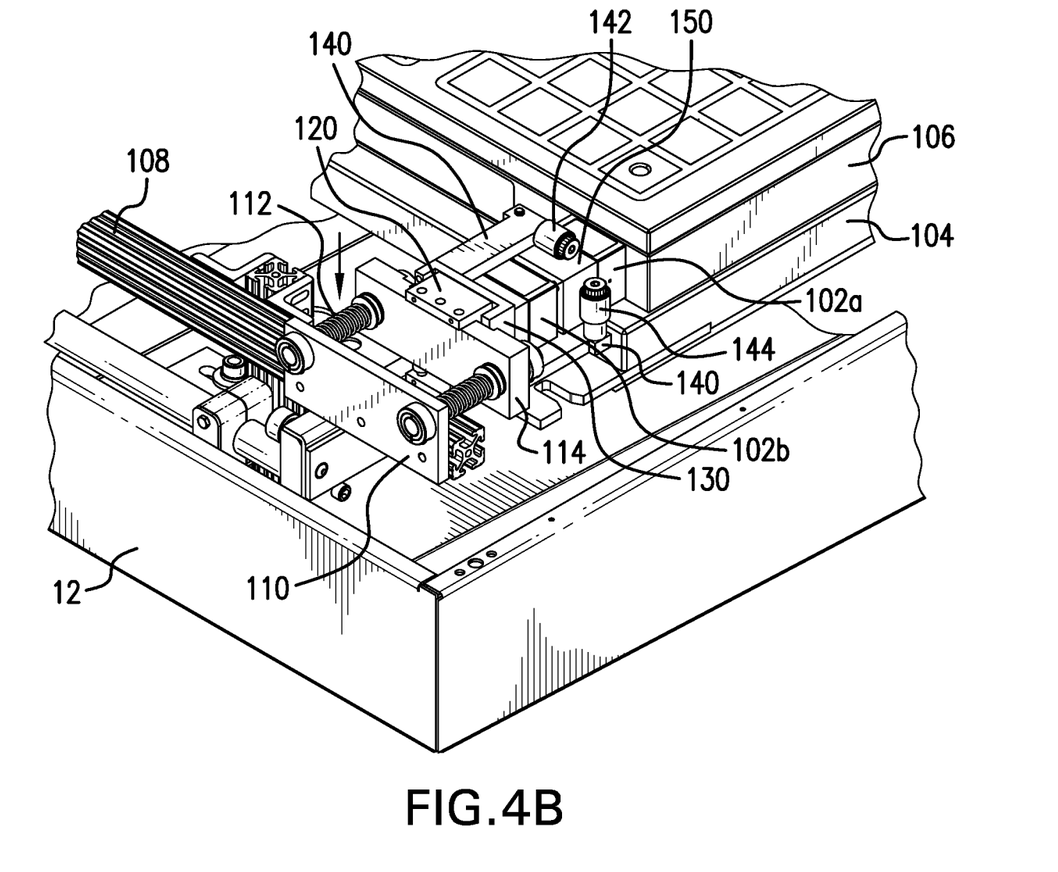
FIG. 4B is a close-up, right-side, perspective view of the alignment system of FIG. 2 with the alignment system shifted downward.
Figure 4C:
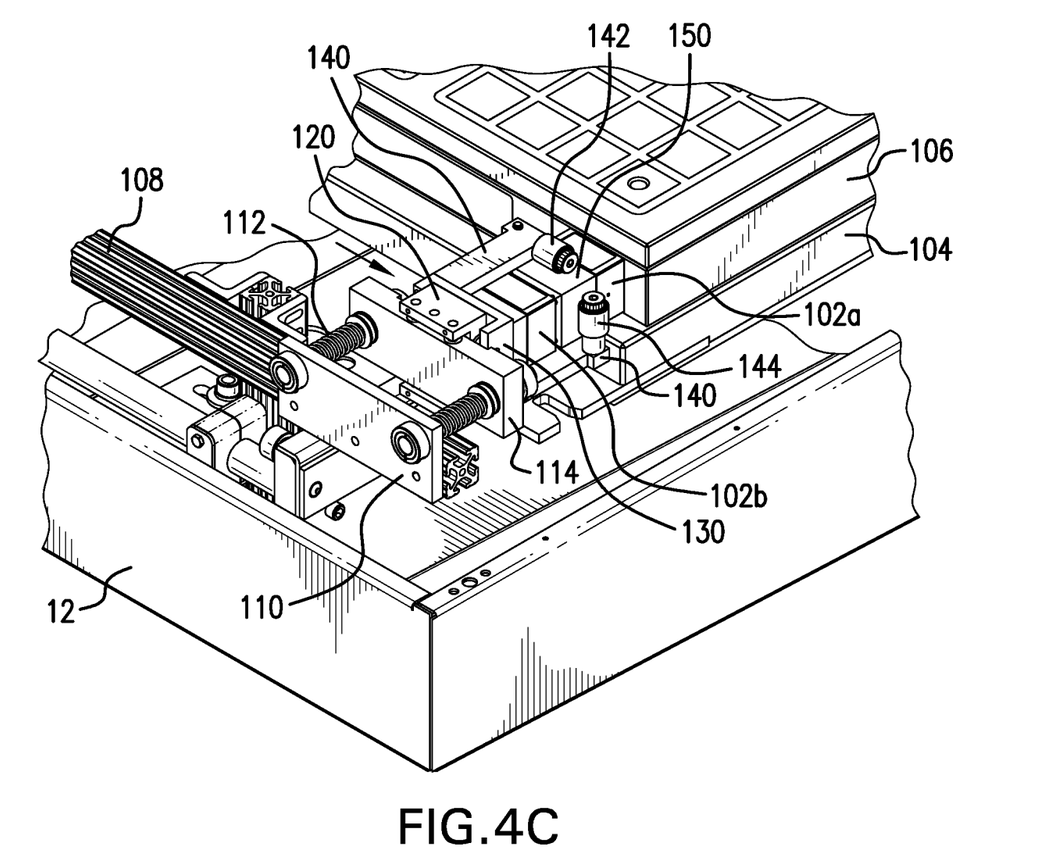
FIG. 4C is a close-up, right-side, perspective view of the alignment system of FIG. 2 with the alignment system shifted to the left.
Figure 4D:
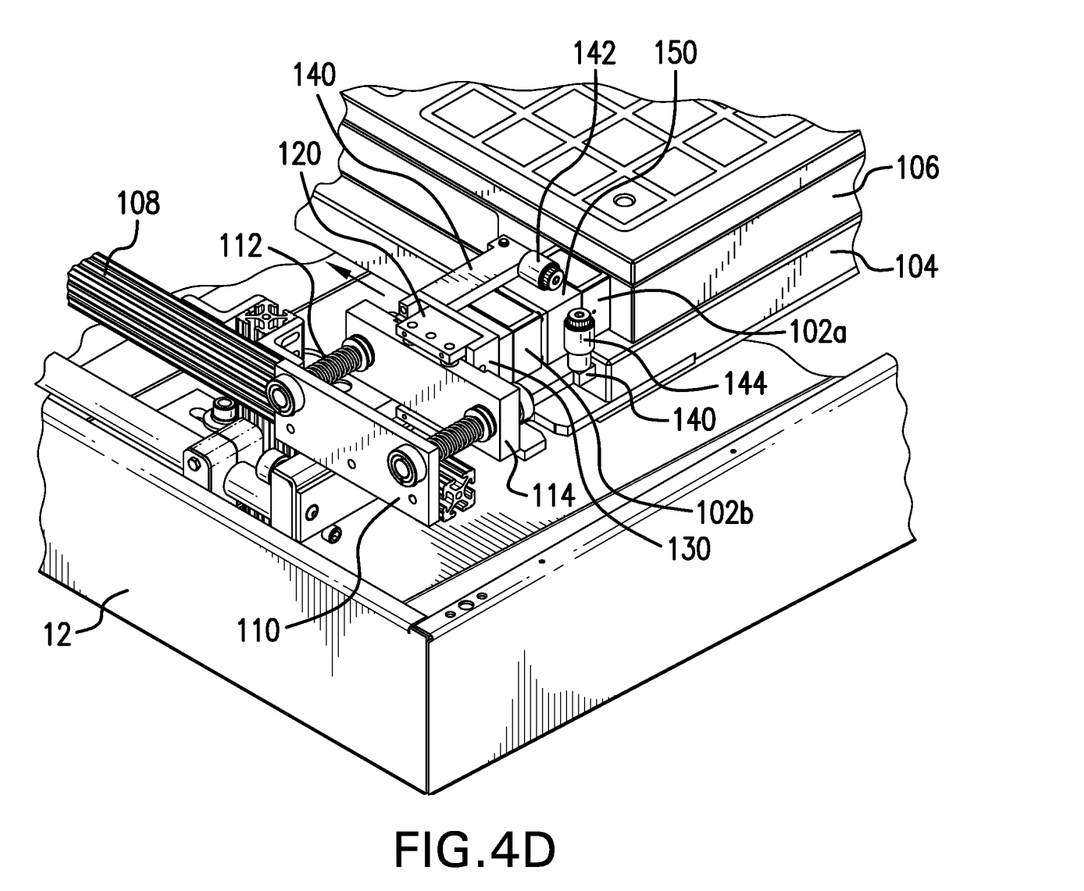
FIG. 4D is a close-up, right-side, perspective view of the alignment system of FIG. 2 with the alignment system shifted to the right.

FIGS. 4A-4D illustrate the movement of alignment system 100. FIG. 4A shows alignment system 100 shifted upward, FIG. 4B shows alignment system 100 shifted downward, FIG. 4C shows alignment system 100 shifted to the left, and FIG. 4D shows alignment system 100 shifted to the right. When pallet 104 is moved by pallet changing system 10 out of the machining center it moves towards alignment system 100. Guide block 150 around plug 102a that is attached to magnetic chuck 106 on top of pallet 104 z-alignment block 120 and y-alignment block 130 enters the area defined by wheel bars 140. Y-axis roller 142 and a z-axis roller 144 on wheel bars 140 roll across chamfered surfaces 152 on guide block 150, which causes wheel bars 140 to shift about the Z-axis and the Y-axis which in turn shifts socket 102b about the same axis into alignment with plug 102a on magnetic chuck 106. This automatically connects pair of electrical connectors 102 for the demagnetization of magnetic chuck 106 so that the finished workpieces can be removed and new workpieces added.

Those skilled in the art will recognize that components illustrated and described herein can be oriented in a variety of manners. Instead of the z-alignment block being directly combined to the mounting bracket, the y-alignment block can be directly combined to the mounting bracket with the z-alignment block being directly combined to the y-alignment block. Also, instead of socket 102b of pair of electrical connectors 102 being combined directly to y-alignment block 130, it can be combined directly to z-alignment block 120. Since electrical power is provided to socket 102b, for safety purposes it is preferred to be the female connector with plug 102a being the male connector on magnetic chuck 106. Pair of electrical connectors 102, however, can be implemented as any type of electrical connectors.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

I claim:

1. An alignment system for a pair of electrical connectors on a pallet changing system comprising a support station for supporting a pallet and a magnetic chuck that moves to and from a machining center, the alignment system comprising:
    a mounting bracket combined to the support station;
    a z-alignment block combined to the mounting bracket for movement with respect to the mounting bracket about a z-axis;
    a y-alignment block combined to the mounting bracket for movement with respect to the mounting bracket about a y-axis;
    one electrical connector of the pair of electrical connectors combined to one of the z-alignment block or the y-alignment block; and
    a guide combined to one of the z-alignment block or the y-alignment block to guide the one electrical connector of the pair of electrical connectors to the other electrical connector electrically connected to the magnetic chuck.

2. The alignment system of claim 1, and further comprising a guide block comprising a chamfered surface around a perimeter combined to the other electrical connector that is connected to the magnetic chuck.

3. The alignment system of claim 1, wherein the guide further comprises a pair of wheel bars extending about an x-axis outward from the electrical connector combined to one of the z-alignment block or the y-alignment block.

4. The alignment system of claim 3, wherein the pair of wheel bars each further comprise a y-axis roller and a z-axis roller.

5. The alignment system of claim 4, wherein the y-axis roller and a z-axis roller on each of the pair of wheel bars is oriented in the opposite direction of each other.

6. The alignment system of claim 1, wherein the z-alignment block is directly combined to the y-alignment block by a linear bearing on a shaft so that the y-alignment block moves about the y-axis with respect to the z-alignment block.

7. The alignment system of claim 1, and further comprising a block combined to the mounting bracket by a guide shaft and a spring oriented on an x-axis.

8. The alignment system of claim 7, wherein the z-alignment block is directly combined to the block by a first linear bearing on a first shaft so that the z-alignment block moves about the z-axis with respect to the block.

9. The alignment system of claim 7, wherein the block further comprises a first hole extending in the z-axis there through and further comprising a first rod and a first spring combining the block and the z-alignment block to align the z-alignment block relative to the block.

10. The alignment system of claim 9, and further comprising a second hole extending into a top of the block oriented on the z-axis and a second rod, a second spring, and a set screw to adjust a distance of travel of the z-alignment block relative to the block.

11. The alignment system of claim 8, wherein the y-alignment block is directly combined to the z-alignment block by a second linear bearing on a second shaft so that y-alignment block moves about the y-axis with respect to the z-alignment block.

12. The alignment system of claim 1, and further comprising a connection block combined between the one electrical connector of the pair of electrical connectors and the one of the z-alignment block or the y-alignment block, wherein the connection block comprises of a through hole in which to receive electrical wiring to the one electrical connector.

13. The alignment system of claim 12, wherein the connection block further comprises of a drain hole to drain coolant that seeps into the one electrical connector.

14. An alignment system for a pair of electrical connectors on a pallet changing system comprising a support station for supporting a pallet and a magnetic chuck that moves to and from a machining center, the alignment system comprising:
    a mounting bracket combined to the support station;
    a block;
    a dampening system combined between the mounting bracket and the block oriented along an x-axis;
    a z-alignment block and a y-alignment block with one of the z-alignment block and the y-alignment block being combined to the block for movement with respect to the block; and
    an electrical connector of the pair of electrical connectors combined to the block for relative movement about a y-axis and a z-axis.

15. The alignment system of claim 14, wherein the z-alignment block is combined to the block and the y-alignment block is combined to the z-alignment block.

16. The alignment system of claim 15, and further comprising a guide combined to y-alignment block to guide the one electrical connector of the pair of electrical connectors to the other electrical connector electrically connected to the magnetic chuck.

17. The alignment system of claim 16, wherein the guide further comprises a pair of wheel bars extending about an x-axis outward from the electrical connector, wherein the pair of wheel bars each further comprise a y-axis roller and a z-axis roller oriented in the opposite direction of each other surrounding a space in which to receive the other electrical connector that is electrically connected to the magnetic chuck.

* * * * *